United States Patent
Konishi et al.

(10) Patent No.: US 8,136,097 B2
(45) Date of Patent: Mar. 13, 2012

(54) THREAD DEBUGGING DEVICE, THREAD DEBUGGING METHOD AND INFORMATION STORAGE MEDIUM

(75) Inventors: Yousuke Konishi, Tokyo (JP); Shinichiro Mikami, Chiba (JP); Makoto Ishii, Tokyo (JP); Yasuyuki Kinoshita, Tokyo (JP); Atsuhiko Fujimoto, Saitama (JP); Masayuki Takahashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1482 days.

(21) Appl. No.: 11/586,345

(22) Filed: Oct. 25, 2006

(65) Prior Publication Data

US 2007/0168985 A1 Jul. 19, 2007

(30) Foreign Application Priority Data

Nov. 1, 2005 (JP) ................................. 2005-318078

(51) Int. Cl.
*G06F 9/44* (2006.01)
*G06F 9/45* (2006.01)
*G06F 9/46* (2006.01)
*G06F 7/38* (2006.01)

(52) U.S. Cl. ........ 717/129; 717/124; 717/126; 717/127; 717/149; 718/102; 718/104; 712/227

(58) Field of Classification Search .................... None
See application file for complete search history.

(56) References Cited

U.S. PATENT DOCUMENTS

| | | | | |
|---|---|---|---|---|
| 5,450,592 A * | 9/1995 | McLeod | ....................... | 718/104 |
| 6,418,442 B1 * | 7/2002 | Dwyer, III | ................... | 707/747 |
| 6,587,967 B1 | 7/2003 | Bates et al. | | |
| 6,681,384 B1 * | 1/2004 | Bates et al. | ................... | 717/129 |
| 7,058,948 B2 * | 6/2006 | Hoyle | ......................... | 718/104 |
| 7,240,169 B2 * | 7/2007 | Dennie | ....................... | 711/153 |
| 7,496,897 B1 * | 2/2009 | Dibble et al. | ................ | 717/127 |
| 7,774,783 B2 * | 8/2010 | Toader | .......................... | 718/104 |
| 2002/0124205 A1 * | 9/2002 | Grey et al. | ....................... | 714/33 |
| 2002/0124241 A1 * | 9/2002 | Grey et al. | ..................... | 717/149 |
| 2003/0005414 A1 * | 1/2003 | Elliott et al. | .................. | 717/128 |
| 2004/0032867 A1 * | 2/2004 | Basso et al. | .................. | 370/389 |

(Continued)

FOREIGN PATENT DOCUMENTS

JP 11-338733 12/1999

(Continued)

OTHER PUBLICATIONS

David Jackson, "Visual Debugging of Multithreaded Java Programs", Dept. of Computer Science, University of Liverpool, pp. 340-341.*
Chandramohan et al., "Hardware and Software Support for Efficient Exception Handling", Univiersity of Washington, Seattle, pp. 1-19.*
European Search Report dated Mar. 2, 2010, from the corresponding European Application.
Richard M. Stallman, et al. "Debugging with GDB, The GNU Source-Level Debugger" Jan. 31, 1994, retrieved from http://docs.freebsd.org/info/gdb/gdb.pdf.

(Continued)

*Primary Examiner* — Isaac Tecklu
(74) *Attorney, Agent, or Firm* — Katten Muchin Rosenman LLP (57) ABSTRACT

A thread debugging device which can provide reliable debugging is provided when at least one thread is debugged among a plurality of threads which are executed in association with each other. According to the thread debugging device, a target computer (20) executes at least some processing of at least one target thread to be debugged among the plurality of threads, and further executes non-target threads, which are threads other than the at least one target thread among the plurality of threads, during execution of the at least one target thread while restricting access by the non-target threads to at least some hardware resources of the computer (20).

4 Claims, 4 Drawing Sheets

U.S. PATENT DOCUMENTS

| | | | |
|---|---|---|---|
| 2004/0098721 A1* | 5/2004 | Alverson et al. | 718/102 |
| 2004/0261080 A1* | 12/2004 | Chan et al. | 719/310 |
| 2006/0031844 A1* | 2/2006 | Dice et al. | 718/106 |
| 2006/0041872 A1* | 2/2006 | Poznanovic et al. | 717/140 |
| 2006/0143610 A1* | 6/2006 | Toader | 718/100 |
| 2007/0094669 A1* | 4/2007 | Rector et al. | 718/104 |
| 2011/0119674 A1* | 5/2011 | Nishikawa | 718/103 |

FOREIGN PATENT DOCUMENTS

| | | |
|---|---|---|
| WO | 01/52064 | 7/2001 |
| WO | 03/040921 | 5/2003 |

OTHER PUBLICATIONS

Richard Stallman, et al., "Debugging with GDB" The GNU Source-Level Debugger Eighth Edition, for GDB version 5.0, Mar. 2000, http://sunsite.ualberta.ca/Documentation/Gnu/gdb-5.0/html_node/gdb_toc.html.

European Communication Pursuant to Article 94(3) EPC dated Dec. 29, 2011, from corresponding European Application No. 06 255 589.1.

* cited by examiner

| No. | THREAD IDENTIFIER | THREAD GROUP IDENTIFIER | PROCESS IDENTIFIER | TCP SOCKET NUMBER | CONTROL INFORMATION |
|---|---|---|---|---|---|
| 1 | 0x04000100 | 0x04000000 | 0x01000100 | 0x1 | CONNECTION (stop) |
| 2 | 0x04000200 | 0x04000000 | 0x01000100 | 0x2 | CONNECTION (stop) |
| 3 | 0x04000300 | 0x04000000 | 0x01000100 | 0x3 | CONNECTION (stop) |
| ... | ... | ... | ... | ... | ... |

FIG. 2B

| No. | THREAD IDENTIFIER | THREAD GROUP IDENTIFIER | PROCESS IDENTIFIER | TCP SOCKET NUMBER | CONTROL INFORMATION |
|---|---|---|---|---|---|
| 1 | 0x04000100 | 0x04000000 | 0x01000100 | 0x1 | CONNECTION (cont) |
| 2 | 0x04000200 | 0x04000000 | 0x01000100 | 0x2 | CONNECTION (stop) |
| 3 | 0x04000300 | 0x04000000 | 0x01000100 | 0x3 | CONNECTION (stop) |
| ... | ... | ... | ... | ... | ... |

FIG. 2C

| No. | THREAD IDENTIFIER | THREAD GROUP IDENTIFIER | PROCESS IDENTIFIER | TCP SOCKET NUMBER | CONTROL INFORMATION |
|---|---|---|---|---|---|
| 1 | 0x04000100 | 0x04000000 | 0x01000100 | 0x1 | CONNECTION (cont) |
| 2 | 0x04000200 | 0x04000000 | 0x01000100 | 0x2 | CONNECTION (lcont) |
| 3 | 0x04000300 | 0x04000000 | 0x01000100 | 0x3 | CONNECTION (stop) |
| ... | ... | ... | ... | ... | ... |

FIG. 2D

| No. | THREAD IDENTIFIER | THREAD GROUP IDENTIFIER | PROCESS IDENTIFIER | TCP SOCKET NUMBER | CONTROL INFORMATION |
|---|---|---|---|---|---|
| 1 | 0x04000100 | 0x04000000 | 0x01000100 | 0x1 | CONNECTION (cont) |
| 2 | 0x04000200 | 0x04000000 | 0x01000100 | 0x2 | CONNECTION (lcont) |
| 3 | 0x04000300 | 0x04000000 | 0x01000100 | 0x3 | CONNECTION (lcont) |
| ... | ... | ... | ... | ... | ... |

THREAD DEBUGGING DEVICE, THREAD DEBUGGING METHOD AND INFORMATION STORAGE MEDIUM

BACKGROUND OF THE INVENTION

1. Field of the Invention

The present invention relates to a thread debugging device, a thread debugging method and an information storage medium for debugging at least one thread among a plurality of threads which are executed in association with each other on a computer.

2. Description of the Related Art

A debugger is a computer program for supporting the location of failures (bugs) in computer programs. Using a debugger allows a user to arbitrarily set a breakpoint in a source program whereby execution of the program can be interrupted at a point corresponding to the breakpoint and execution of the interrupted program can be restarted. Further, using a debugger also allows a user to execute a program by a predetermined processing amount (for example, commands corresponding to one step of a source program) and to verify data contents stored in a register or memory during execution or interruption of the program.

In particular, a debugger using the GNU source-level debugger (GDB) makes it possible to arbitrarily specify all or some of a plurality of threads or processes to be executed on a computer, to interrupt or restart execution of the specified threads or processes or to perform execution thereof by a predetermined processing amount (see the following reference).

Richard Stallman, Roland Pesch, Stan Shebs, et.al., "Debugging with GDB" [online], Mar. 2000, [retrieved on Sep. 22, 2005] Retrieved from the Internet: <URL:http://www.asahi-net.or.jp/~wg5 k-ickw/html/online/gdb-5.0/gdb-ja_toc.html>.

However, when the aforementioned prior art technique is applied to a part of a group of threads which operate in association with each other, some disadvantage may arise. Specifically, when only some of threads to be debugged are executed among the plurality of thread groups which operate in association with each other, the execution environment of the thread to be debugged becomes significantly different from its original execution environment. This is because since the threads not to be debugged are not executed, reference of the data in a memory shared by these threads becomes impossible, or a hardware resource shared by the threads is not mapped and therefore an address space itself to be referenced by the thread to be debugged becomes different from the original one.

On the other hand, since debugging is carried out in an execution environment similar to the original execution environment, when a group of threads which operate in association with each other operates around the same time, any of the threads except the thread to be debugged access a hardware resource such as a memory on a computer, as a result of which, for example, a variable that is referenced in common is rewritten. Therefore, for example, if a user tries to prove the details of processing for only the thread to be debugged after a certain point, an operation by only the thread to be debugged cannot be traced.

The present invention has been made in view of the aforementioned circumstances, and an object of the invention is to provide a thread debugging device, a thread debugging method and an information storage medium which can provide reliable debugging when at least one thread among a plurality of threads which are adapted to operate in association with each other is debugged.

SUMMARY OF THE INVENTION

A thread debugging device according to one embodiment of the invention to solve the aforementioned problems is a thread debugging device for debugging at least one thread among a plurality of threads which are executed in association with each other on a computer, comprising: target thread execution means for causing the computer to execute at least some processing of at least one target thread to be debugged among the plurality of threads; and non-target thread execution means for causing the computer to execute non-target threads, which are threads other than the at least one target thread among the plurality of threads, during execution of the at least one target thread by the target thread execution means while restricting access by the non-target threads to at least some hardware resources of the computer.

Further, a thread debugging device according to another embodiment of the invention is a thread debugging device for debugging at least one thread among a plurality of threads which are executed in association with each other on a computer and adapted to sequentially execute respective predetermined command sequences, comprising: target thread execution means for causing the computer to execute at least some processing of at least one target thread to be debugged among the plurality of threads; and non-target thread execution means for causing the computer to execute non-target threads, which are threads other than the at least one target thread among the plurality of threads, during execution of the at least one target thread by the target thread execution means while restricting advance of processing of the command sequences of the non-target threads.

A thread debugging method according to the invention is a thread debugging method for debugging at least one thread among a plurality of threads which are executed in association with each other on a computer, comprising: a first step of causing the computer to execute at least some processing of at least one target thread to be debugged among the plurality of threads; and a second step of causing the computer to execute non-target threads, which are threads other than the at least one target thread among the plurality of threads, during execution of the at least one target thread according to the first step while restricting access by the non-target threads to at least some hardware resources of the computer.

Further, an information storage medium of the invention is a computer readable information storage medium which stores therein a program for debugging at least one thread among a plurality of threads which are executed in association with each other on a target computer, wherein the program causes a computer to function as: target thread execution means for causing the target computer to execute at least some processing of at least one target thread to be debugged among the plurality of threads; and non-target thread execution means for causing the target computer to execute non-target threads, which are threads other than the at least one target thread among the plurality of threads, during execution of the at least one target thread by the target thread execution means while restricting access by the non-target threads to at least some hardware resources of the target computer.

Further objects, features and advantages of the present invention will become apparent from the following description of the preferred embodiments with reference to the attached drawings.

DESCRIPTION OF THE PREFERRED EMBODIMENTS

A thread debugging device according to one embodiment of the invention is a thread debugging device for debugging at least one thread among a plurality of threads which are executed in association with each other on a computer, comprising: target thread execution means for causing the computer to execute at least some processing of at least one target thread to be debugged among the plurality of threads; and non-target thread execution means for causing the computer to execute non-target threads, which are threads other than the at least one target thread among the plurality of threads during execution of the at least one target thread by the target thread execution means while restricting access by the non-target threads to at least some hardware resources of the computer.

As a result, the thread debugging device according to the particular embodiment can provide reliable debugging by causing the threads which are associated with a thread to be debugged to be executed during the execution of the thread to be debugged, while restricting access by the threads to a hardware resource.

The aforementioned thread debugging device may further include command embedding means for embedding a command in each non-target thread to execute processing to jump to itself, wherein the non-target thread execution means may restrict access by the non-target threads to hardware resources by causing the non-target threads to execute the embedded command. As a result, the thread debugging device according to the embodiment can restrict access to a hardware resource by the threads not to be debugged by simple processing.

The aforementioned thread debugging device may further include table holding means for holding a thread table which associates each thread contained in the plurality of threads with information that represents whether or not embedding of a command by the command embedding means has been performed with respect to the respective threads, wherein the target thread execution means may cause the computer to execute the target threads when the target thread execution means determines that embedding of a command by the command embedding means has been performed with respect to each non-target thread based on the thread table. As a result, even when an independent debug program executes embedding of commands to respective threads, the thread debugging device according to the embodiment can cause the respective threads to be executed waiting for completion of preparation for execution of the respective threads by embedding commands to the respective threads not to be debugged.

Further, in the aforementioned thread debugging device, the plurality of threads may be respectively allocated to a plurality of processors within the computer and executed, and these threads map hardware resources in the processors to which the respective threads may be allocated to an address space referred to by each thread such that the hardware resources can be referred to by each thread. As a result, reliable debugging can be provided, for example, when pipeline processing by a plurality of threads which are executed around the same time is realized.

Further, a thread debugging device according to another embodiment of the invention is a thread debugging device for debugging at least one thread among a plurality of threads which are executed in association with each other on a computer and adapted to sequentially execute respective predetermined command sequences, comprising: target thread execution means for causing the computer to execute at least some processing of at least one target thread to be debugged among the plurality of threads; and non-target thread execution means for causing the computer to execute non-target threads, which are threads other than the at least one target thread among the plurality of threads during execution of the at least one target thread by the target thread execution means while restricting advance of processing of the command sequences of the non-target threads. As a result, the commands after a predetermined point in the command sequence of the non-target thread are not executed. In this way, only the processing of the threads to be debugged in the environment where the plurality of threads are executed can be proved, whereby highly reliable debugging can be provided.

An embodiment of the present invention will be described below with reference to the accompanying drawing.

Figure 1:
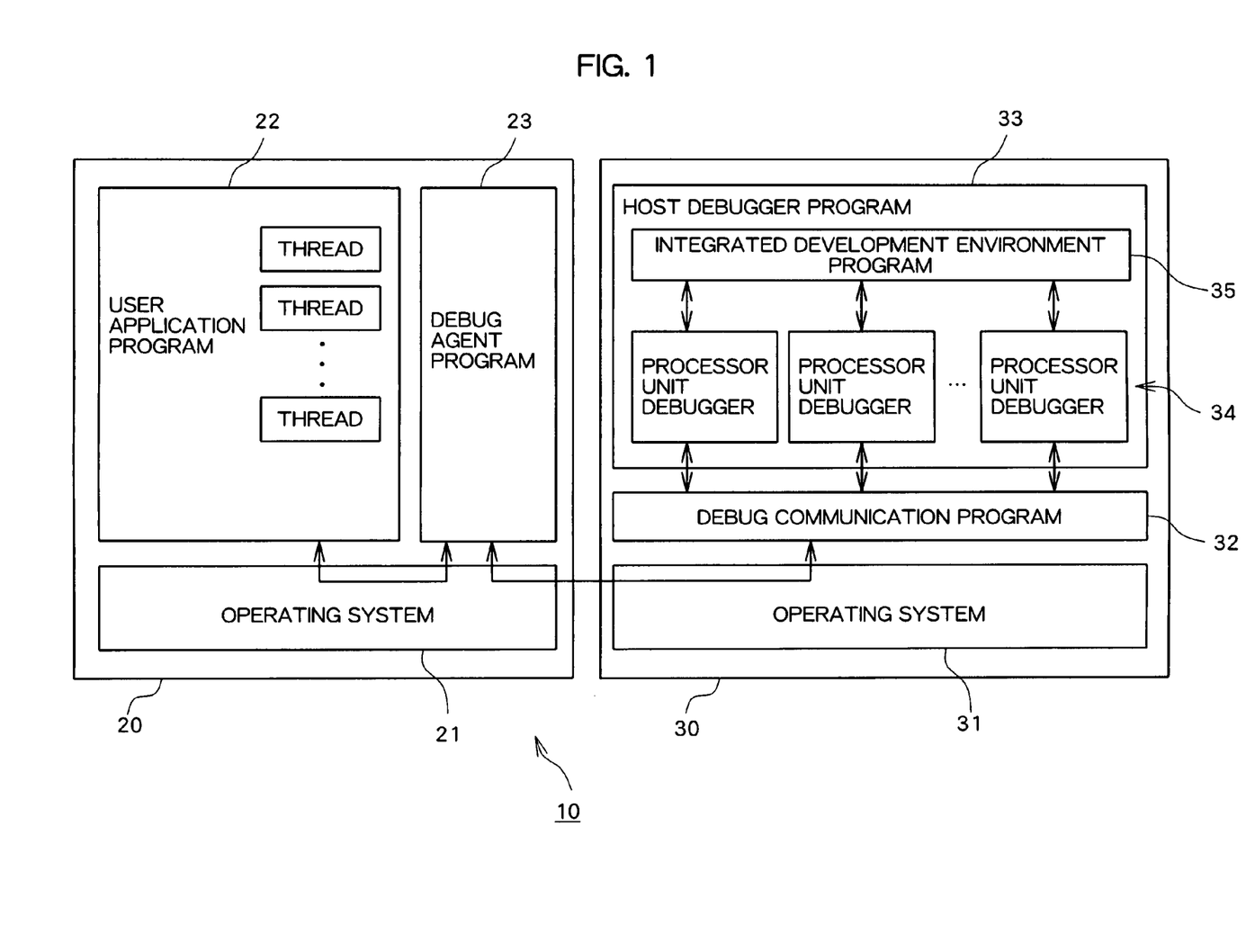
FIG. 1 shows a program development environment according to an embodiment of the invention.

FIG. 1 shows a program development environment according to an embodiment of the invention, by way of example. This program development environment 10, to which a program debugging method according to an embodiment of the invention is applied, comprises a target computer 20 and a host computer 30 which are connected via a data communication network (not shown).

The target computer 20 is a computer on which a program containing a plurality of threads to be debugged by the host computer 30 is executed. Further, the host computer 30 is a computer which serves as a thread debugging device according to an embodiment of the invention, and is provided for debugging a thread executed on the target computer 20. These computers include, for example, a known personal computer system, a workstation, and a game machine which can execute a program.

Here, the target computer 20 comprises a plurality of processor units (PU). Each PU has two components: a processor for executing a command contained in a program such as a thread assigned thereto; and a local memory that the processor can write data to and read data from.

An operating system (OS) 21 is executed on the target computer 20. Further, the OS 21 runs a user application program 22 and a debug agent program 23. The user application program 22 is a program for executing a plurality of threads and is to be debugged by a user. The OS 21 performs a scheduling task for allocating the plurality of threads to any of the PUs according to a predetermined order or timing. This enables the plurality of threads to be executed on the target computer 20 around the same time.

The debug agent program 23 is a kind of application program which operates on the OS 21. This debug agent program 23 operates according to control from the host computer 30 and sends to the host computer 30 various debugging data obtained from the OS 21. The OS 21 contains various library programs for debugging. The debug agent program 23 uses these programs in such tasks as executing control such as discontinuation of execution or restart of execution of threads with respect to the user application program 22, and checking the contents of a memory or a register. Further, the debug agent program 23 monitors events such as the process of the user application program 22 reaching a preset breakpoint, program exception occurring, and step execution completing. When the debug agent program 23 detects a predetermined event, the debug agent program 23 notifies the host computer of it.

An OS 31 is running on the host computer 30. Further, the OS 31 runs a debug communication program 32 and a host debugger program 33. The debug communication program 32 serves to relay data communication between the host debugger program 33 and the debug agent program 23. It converts data such as a control command from the host debugger program 33 into data having a form which can be processed by the debug agent program 23, and then transmits the converted data via the data communication network. Further, the debug communication program 32 receives data transmitted from the debug agent program 23 via the data communication network, converts it into data having a form which can be processed by the host debugger program 33, and then outputs the converted data to the host debugger program 33.

The host debugger program 33 is a kind of application program for performing a debugging operation of the user application program 22. The host debugger program 33 can specify all or some of a plurality of threads to be activated by the user application program 22 and instruct to suspend or restart the execution thereof. Further, the host debugger program 33 can set a breakpoint at a point corresponding to an arbitrary position in source code of the user application program 22, write data in the memory or register of the target computer 20, or read out data therefrom. Still further, the host debugger program 33 can acquire a thread list and information regarding a state of a thread by referring to the memory or register of the target computer 20.

Here, the host debugger program 33 comprises at least one processor unit (PU) debugger 34 and an integrated development environment program 35. The PU debugger 34 is a debugger program provided corresponding on a one-to-one basis to at least some of the plurality of PUs of the target computer 20. The PU debugger 34 performs a debugging process by issuing a control command to the thread of the user application program 22 which is allocated to the PU corresponding thereto and is being executed. The integrated development environment program 35 is an application program for providing a user with an integrated development environment. In the particular embodiment, the integrated development environment program 35 serves as an interface between the PU debuggers 34 and the user. Specifically, the integrated development environment program 35 receives an instruction from a user to perform debugging and outputs data such as control commands corresponding to the contents of the instruction to the respective PU debuggers 34. Further, the integrated development environment program 35 controls to output information such as a state of a corresponding thread that each PU debugger 34 acquires and the contents of the memory or register to which each thread refers to a display unit or the like connected to the host computer 30.

Each program described above may be provided in a form stored in a variety of information storage media such as a CD-ROM and a DVD-ROM that a computer can read. In this case, each program is read from the information storage medium, installed in the target computer 20 or the host computer 30 and executed.

Further, the host computer 30 holds a thread table to and from which the debug communication program 32 can write and read. The thread table is a data base which contains contents illustrated in FIG. 2A, by way of example. In the example shown in FIG. 2A, the thread table holds a thread identifier, a thread group identifier, a process identifier, a TCP socket number and control information of the thread which are associated with each other.

Figure 2A:
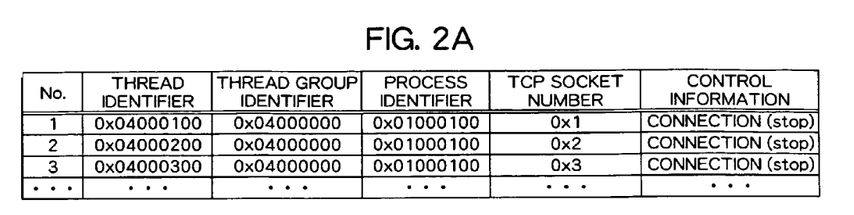
FIG. 2 shows an example of a thread table that a host computer holds.

As used herein, the thread identifier is identification information for identifying each thread. This is a unique value for each thread executed by the OS 21. Further, the thread group identifier is identification information for identifying a thread group to which each thread belongs when a plurality of threads are controlled as a group by the OS 21. Further, the process identifier is identification information for identifying a process which activates the relevant thread. Information of the identifiers can be obtained from the debug agent program 23. Further, the TCP socket number is a number representing a TCP socket used for communication with the PU debugger 34 for controlling each thread. Furthermore, the control information of each thread is information which is updated based upon either or both of a control command for each thread output from the PU debugger 34 and information on the state of the thread transmitted from the debug agent program 23. The control information is information used for controlling the thread including information as to whether or not a connection which can control the thread is established.

One example of processing by the program development environment 10 will be described below using a timing chart. In the following description, assume that plural threads contained in a user application program 22 are programs for sequentially executing predetermined command sequences, respectively. Further, by way of example, assume that three threads (thread Ta, thread Tb and thread Tc) among the plural threads contained in the user application program 22 are associated with each other.

Specifically, these three threads associated with each other belong to a thread group G. An OS 21 controls all of the threads belonging to the thread group G such that the respective threads are allocated to a plurality of PUs in one-to-one correspondence around the same time, and executed. Further, these threads map hardware resources shared by the threads belonging to the same thread group to an address space referred to by each thread such that hardware resources such as a local memory in an allocated PU, for example, can be referred to by each associated thread. By controlling the operation of the threads belonging to the same thread group in this way, when pipeline processing is realized by a plurality of threads, the processing efficiency can be enhanced.

In the following, a PU debugger corresponding to the PU to which the thread Ta is allocated is represented by a PU debugger 34a, a PU debugger corresponding to the PU to which the thread Tb is allocated is represented by a PU debugger 34b, and a PU debugger corresponding to the PU to which the thread Tc is allocated is represented by a PU debugger 34c. Further, assume that the threads Ta, Tb and Tc respectively correspond to threads No. 1, 2 and 3 in a thread table in FIG. 2.

First, an example where a breakpoint is set at a predetermined point in the command sequence of the thread Ta and the three threads belonging to the thread group G are executed based on an instruction from a user will be described below according to a time chart in FIG. 3.

An integrated development environment program 35 that receives the instruction from the user determines whether or not a thread (target thread) to be subjected to breakpoint setting is a thread belonging to a thread group containing a plurality of threads. Specifically, the integrated development environment program 35 obtains a thread group identifier of the target thread with reference to a thread table held by a host computer 30. Then, the integrated development environment program 35 obtains information of a thread having the thread group identifier which is the same as the relevant thread group identifier from the thread table. If a thread having the same thread group identifier is not found, control of the threads belonging to the thread group is not necessary. Thus, the integrated development environment program 35 outputs an instruction command of normal break point setting for to the PU debugger 34 corresponding to the target thread. On the other hand, if a thread having the same thread group identifier besides the target thread is found, the integrated development environment program 35 outputs an instruction command to each thread belonging to the thread group, as described below.

When the target thread subjected to the user's instruction belongs to a thread group containing a plurality of threads, the integrated development environment program 35 outputs an instruction command to each PU debugger 34 in response to the instruction from the user (S1). Specifically, to the PU debugger 34a corresponding to the thread Ta which is an target thread to be debugged, the integrated development environment program 35 outputs a command to set a breakpoint. On the other hand, to the PU debuggers 34b and 34c corresponding to the threads Tb and Tc which are non-target threads that are not to be debugged, the integrated development environment program 35 outputs a command to execute command-embedding for restricting access thereby to hardware resources.

The PU debugger 34a which receives the command output by processing step S1 outputs to the debug communication program 32 a control command to set a breakpoint in the thread Ta along with information of a position where the breakpoint is set (S2). Here, the information of the position where the breakpoint is set is a program counter value which represents the point in the command sequence of the thread Ta corresponding to the position in the source code specified by the user.

The debug communication program 32 which receives the control command converts the control command to a form which can be processed by a debug agent program 23 and transmits the converted control command to the debug agent program 23 (S3). The debug agent program 23 sets a breakpoint at the instructed point in the command sequence of the thread Ta program in response to the received control command (S4).

Figure 2B:
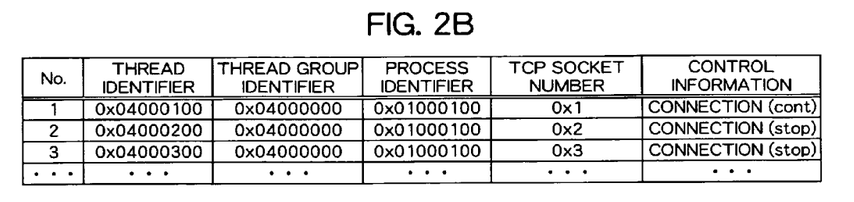

Following processing step S2, the PU debugger 34a outputs to the debug communication program 32 a control command to instruct execution start of the thread Ta (S5). Here, since the PU debugger 34a has already outputted a command for breakpoint setting which is necessary before execution of the thread Ta, it then outputs a control command to instruct execution start of the thread Ta. The debug communication program 32, however, does not transmit the control command to start execution of the thread Ta as it is. It first updates the control information of the thread Ta in the thread table (S6). Specifically, the debug communication program 32 updates the control information of the thread Ta to include the information (referred to herein as "cont") which represents that the control command to instruct execution start for thread Ta has been received. As a result, the contents of the thread table becomes, for example, as shown in FIG. 2B.

On the other hand, the PU debugger 34b which receives the command as a result of processing step S1 outputs to the debug communication program 32 a control command to perform command embedding for restricting access by the thread Tb to hardware resources (S7). This control command may contain information such as a program counter value which represents a position where the command is embedded in the thread Tb. The debug communication program 32 which receives the control command updates the control information of the thread Tb in the thread table (S8).

Figure 2C:
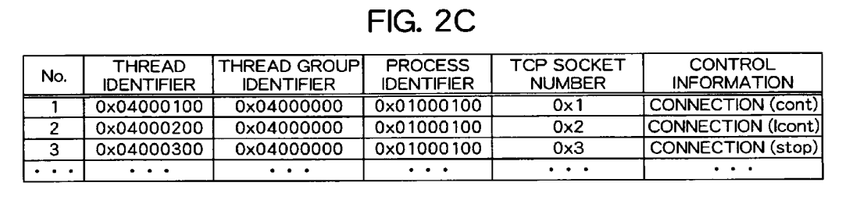

Specifically, the debug communication program 32 updates the control information of the thread Tb to include the information (referred to herein as "lcont") which represents that the control command to execute command embedding for the thread Tb has been received. As a result, the contents of the thread table becomes, for example, as shown in FIG. 2C.

Further, the debug communication program 32 converts the control command output by processing step S7 to a form which can be processed by a debug agent program 23 and transmits the converted control command to the debug agent program 23 (S9). The debug agent program 23 embeds a predetermined command at a predetermined point in the command sequence of the thread Tb program in response to the received control command (S10).

Hereinafter, a description will be given of a command embedded, according to the control command from the PU debugger 34b, in the thread Tb. This command is for restricting access by the thread Tb to at least some hardware resources of a target computer 20. Specifically, as a result of this command embedding, the thread Tb is restricted from accessing, for example, a local memory within the PU, a memory outside the PU, and other storage devices such as a disk drive which are referred to in common by the threads belonging to the thread group G.

The embedded command may be simply, for example, a command for carrying out calculation without accessing a memory or the like. In this case, however, each command executed in the thread Tb should be replaced by such a command. Accordingly, here, assume that a loop command to execute processing to jump to itself is embedded. This is a command represented in the form "BR 00", by way of example. In this case, "BR" represents that this command is a command to jump to a specified position in a command sequence and "00" represents that a position to be jumped to is relatively "0" with respect to a current point in the command sequence. By embedding and causing execution of such a loop command, the thread Tb repeatedly executes a loop to itself at this point in the command sequence, as a result of which a processing command after the point where a command is embedded is not executed. In this way, by embedding a command at one point in the command sequence of the thread Tb, accessing by the thread Tb to a hardware resource such as a memory can be restricted.

Here, the point where a command is embedded is a point to be executed next in the command sequence of the thread Tb. As a result, immediately after starting execution of the thread Tb, the thread Tb repeats the loop processing. In this way, it does not access a hardware resource such as a memory. The point to be executed next in the command sequence may be specified by PU debugger 34b in processing step S7 as described above, or may be acquired by the debug agent program 23 by referring to a program counter value controlled by the PU.

Further, this loop command is also intended to restrict advancing of the processing of the command sequence of the thread Tb. Thus, execution of the command sequence after the point of the thread Tb where the loop command is embedded can be restricted, and it is also possible to inhibit execution of the processing of the thread Tb which would influence the processing of the thread Ta. Further, instead of embedding the loop command as described above, advancing of the processing of the command sequence of the thread may be restricted in an alternative way, for example, by controlling a program counter value which represents an address of the command sequence that the PU would execute next.

Figure 2D:
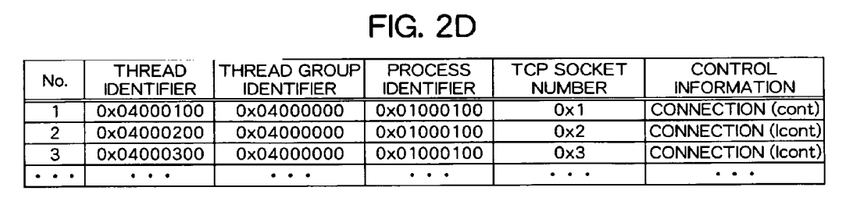

On the other hand, as well as the PU debugger 34b, the PU debugger 34c outputs to the debug communication program 32 a control command to perform command embedding for restricting access by thread Tc to a hardware resource (S11). The debug communication program 32 which receives the control command updates the control information of the thread Tc in the thread table (S12). As a result, the contents of the thread table becomes, for example, as shown in FIG. 2D.

Further, the debug communication program 32 transmits the control command which was output by the processing step S11 to the debug agent program 23 (S13), and the debug agent program 23 executes embedding of a loop command with respect to the thread Tc in response to the received control command as well as the case of the thread Tb (S14).

By processing steps S6, S8 and S12, the debug communication program 32 updates the control information of each thread belonging to the thread group G of the thread table. The debug communication program 32 refers to the thread table at a time when the control information of each thread is updated to include the information (here, information containing "cont" or "lcont") which represents that a state is put into the state where execution of the relevant thread can be started, and determines whether or not execution of each thread belonging to the thread group G is started.

Specifically, the debug communication program 32 obtains a thread group identifier of a thread having updated control information, and further obtains the control information of each thread having the same thread group identifier as the obtained thread group identifier. Further, if all the obtained control information of the threads contains "cont" or "lcont", the debug communication program 32 determines that preparation for executing all the threads belonging to the same thread group has been completed.

Figure 3:
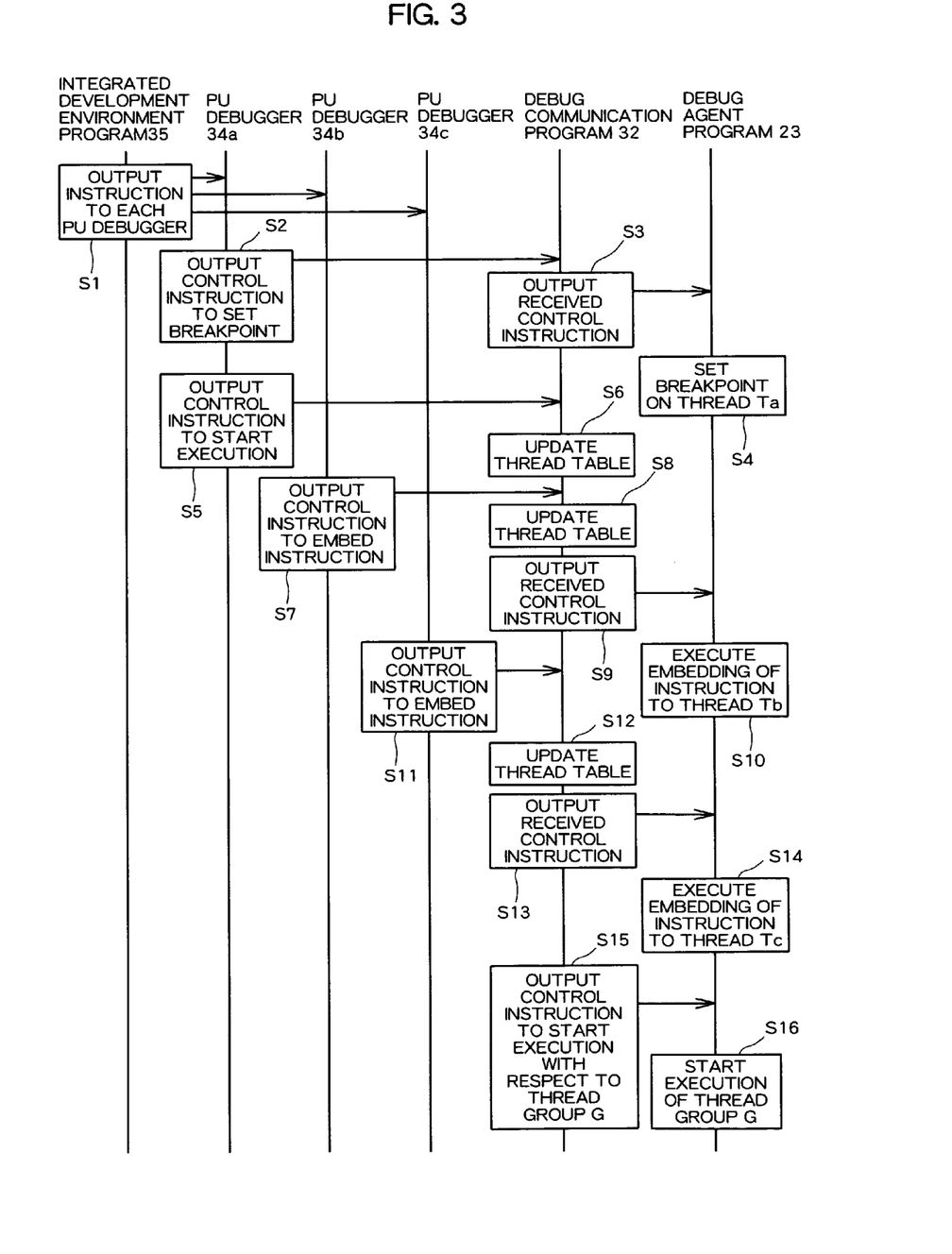
FIG. 3 shows a flowchart showing an example of a process for setting a breakpoint.

In the timing chart shown in FIG. 3, all the control information of the three threads belonging to the thread group G contain "cont" or "lcont" as a result of processing step S12 as shown in FIG. 2D. In this way, after this processing, the debug communication program 32 transmits a control command to start execution of the threads belonging to the thread group G to the debug agent program 23 (S15). As a result, the debug agent program 23 starts execution of the threads Ta, Tb and Tc belonging to the thread group G (S16).

As described above, the debug communication program 32 updates the thread table according to the control command to each thread, and determines whether or not to transmit the control command to start execution of a thread to debug agent program 23 based on the control information on the thread table concerning the threads belonging to the same thread group. In this way, even when the respective independent PU debuggers carry out control of debug processing for the respective threads, control of the threads belonging to the same thread group can be performed at desirable timing.

Figure 4:
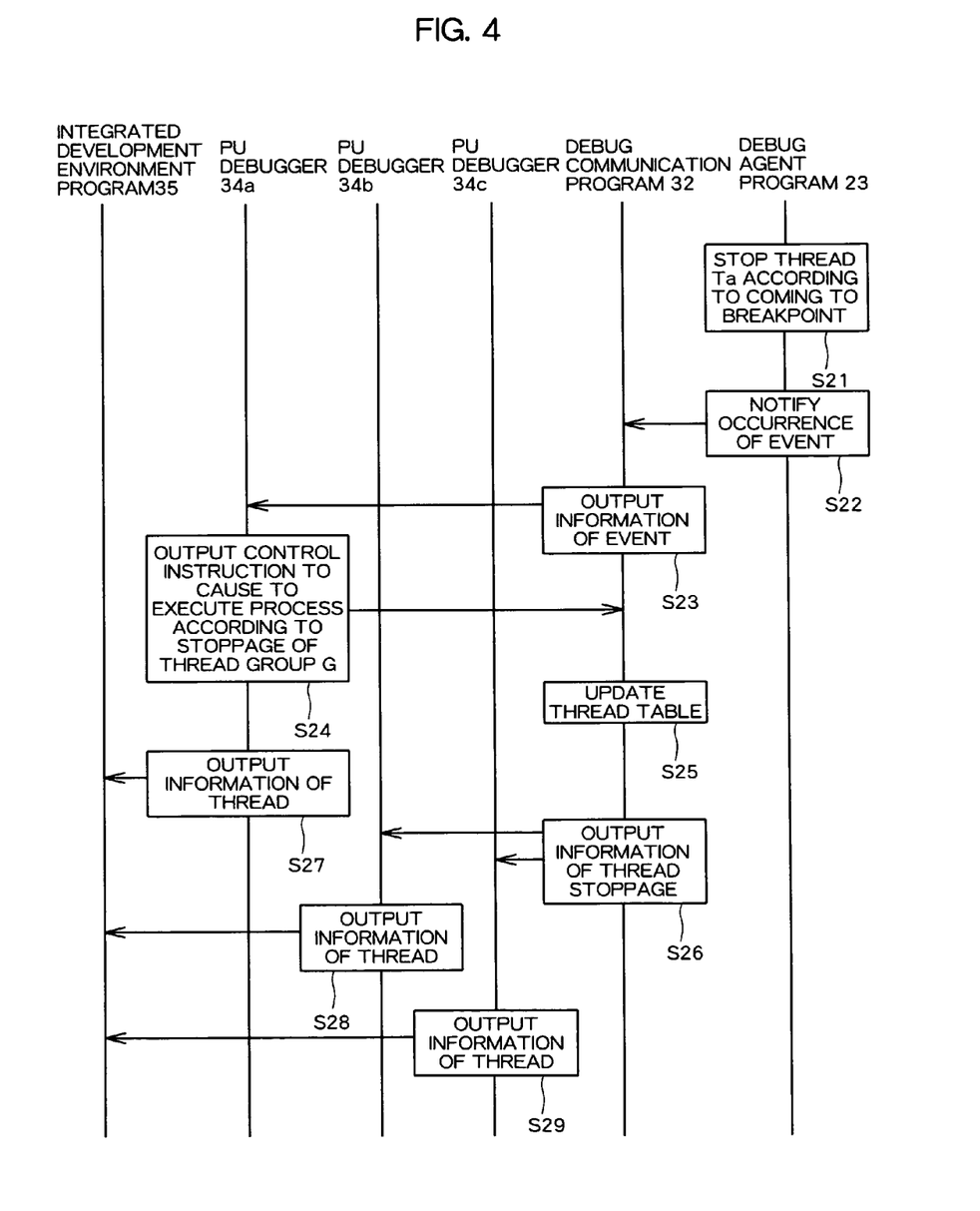
FIG. 4 shows a flowchart showing an example of a process when processing comes to a breakpoint.

Next, an example of processing will be described in connection with a timing chart shown in FIG. 4. Specifically, this example is executed by a program development environment 10 when reaching a breakpoint as a trigger, when processing of the thread Ta is advanced to a point where the breakpoint is set, as described above.

First, when the debug agent program 23 detects the event of reaching the breakpoint in the thread Ta, it stops the execution of the thread Ta (S21). At this time, if the execution of the thread Ta is stopped, execution of the threads Tb and Tc which belong to the thread group G and controlled by the OS 21 to be executed around the same time as the thread Ta is also stopped.

Next, the debug agent program 23 transmits the information indicating the occurrence of the event to the debug communication program 32 (S22). When the debug communication program 32 receives the information indicating the occurrence of the event, the debug communication program 32 outputs this information to the PU debugger 34a corresponding to the thread Ta where the event occurs (S23).

When the PU debugger 34a receives the information which notifies that the thread Ta has stopped, the PU debugger 34a outputs to the debug communication program 32 a control command to execute processing in response to the stopping of the thread group G to which the thread Ta belongs (S24). The control command is not to actually stop of execution of the threads on the target computer 20, but is necessary for executing processing on the host computer 30 in response to the stop of execution of the threads. This is because execution of the threads Tb and Tc belonging to the thread group G is stopped under control of the OS 21 without depending on reaching the breakpoint and the end of the thread, and therefore, unlike in the case of the thread Ta, the event to notify the host computer 30 of the stop of execution does not occur.

The debug communication program 32 which receives the notification of the stop of the thread group G according to processing step S24 updates the control information of each thread in the thread table (S25). Specifically, the control information of each thread belonging to the thread group G is updated to include the information (referred to herein as "stop") which represents that the execution of the thread is at a stop. As a result, the content of the thread table returns to that shown in FIG. 2A.

Then, the debug communication program 32 outputs information which notifies the PU debuggers 34 corresponding to the respective threads belonging to the thread group G other than the thread Ta of the stopping of the threads, respectively (S26). Specifically, the debug communication program 32 notifies the PU debugger 34b of the stopping of the thread Tb, and notifies the PU debugger 34c of the stopping of the thread Tc.

The PU debuggers, which receive the notification that the corresponding threads have stopped as a result of the processing steps S23 and S26, output information regarding the states of the respective threads to the integrated development environment program 35 (S27, S28 and S29). As a result, the integrated development environment program 35 updates the information regarding the respective threads to be presented to a user.

According to the processing steps as described above, when any one of the threads belonging to the thread group G stops upon reaching the breakpoint, the host computer 30 can execute a process for the case where the execution of the threads Tb and Tc is also stopped based on the event information which indicates that the execution of the thread Ta where the breakpoint is set has stopped.

In accordance with the embodiment described above, it is possible to execute a thread to be debugged on the target computer 20 according to a control command from the host debugger program 33 and to execute the threads that are not to be debugged during the execution of the thread to be debugged while being restricted in accessing at least some hardware resources of the target computer 20. In this way, operations of a particular thread to be debugged can be verified while executing a plurality of threads associated with each other in a condition similar to their original execution environment, as a result of which highly reliable debugging can be performed.

In the foregoing descriptions, the example when threads belonging to a thread group are executed with a breakpoint being set is described. In the program development environment 10 according to the embodiment, however, even when other types of debugging processing are performed, debugging can be similarly accomplished while restricting access to a hardware resource by the threads that are not to be debugged. For example, when it is desired to prove operations of a thread (for example, the thread Tb) among the threads belonging to the thread group G while executing commands corresponding to one step of a source program, a loop command as described above is embedded beforehand in the threads Ta and Tc which are not subjected to debugging, and the respective threads belonging to the thread group G are executed. As a result, the thread Tb can be advanced by one step of the source program while restricting access to a hardware resource such as a memory by the threads Ta and Tc.

Further, in the program development environment 10, it is also possible to execute a plurality of threads that are to be debugged while executing the threads, which are not to be debugged and operate in association with the plurality of threads, with access thereby to a hardware resource being restricted. As a result, also when it is desired to prove the processing when a plurality of threads to be debugged are executed in association with each other, debugging can be performed in a condition similar to their original execution environment.

The present invention is not limited to the embodiments described above, but can be implemented in a variety of forms. While, in the above description, debugging is executed by the host computer 30 which is different from the target computer 20 on which the thread to be debugged is executed, a program similar to the host debugger program 33 may be executed upon the target computer 20. In this case, a user can perform debugging of a program on a single computer. Further, the control of threads belonging to a single thread group using a thread table realized by the debug communication program 32 in the foregoing description may be realized by other programs, for example, such as the host debugger program 33 and the debug agent program 23.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A thread debugging device, comprising a processor for debugging at least one thread among a plurality of threads which are executed in association with each other on a computer and adapted to sequentially execute respective predetermined command sequences of threads, said thread debugging device having a stored algorithm that includes instructions for performing thread debugging features comprising:

causing the computer to execute at least some processing of at least one target thread to be debugged among the plurality of threads;

causing the computer to execute non-target threads, which are threads other than the at least one target thread among the plurality of threads, during execution of the at least one target thread while restricting advance of processing of the command sequences of the non-target threads; and when debugging a target thread, embedding a command in each non-target thread to execute processing to jump to itself, wherein the advance of processing of the command sequences of the non-target threads is restricted by causing the non-target threads to execute the embedded command, wherein the plurality of threads are respectively allocated to a plurality of processors within the computer and executed, and these threads map hardware resources in the processors to which the respective threads are allocated to an address space referred to by each thread such that the hardware resources can be referred to by each thread.

2. The thread debugging device according to claim 1, said thread debugging features further comprising holding a thread table which associates each thread contained in the plurality of threads with information that represents whether or not embedding of a command has been performed with respect to the respective threads; and causing the computer to execute the at least one target thread when it is determined that embedding of a command has been performed with respect to each non-target thread based on the thread table.

3. A thread debugging method for debugging at least one thread among a plurality of threads which are executed in association with each other on a computer and adapted to sequentially execute respective predetermined command sequences of threads, comprising:

a first step of causing the computer to execute at least some processing of at least one target thread to be debugged among the plurality of threads;

a second step of causing the computer to execute non-target threads, which are threads other than the at least one target thread among the plurality of threads, during execution of the at least one target thread by the first step while restricting advance of processing of the command sequences of the non-target threads; and when debugging a target thread, a third step of embedding a command in each non-target thread to execute processing to jump to itself, wherein the advance of processing of the command sequences of the non-target threads is restricted by causing the non-target threads to execute the embedded command, wherein the plurality of threads are respectively allocated to a plurality of processors within the computer and executed, and these threads map hardware resources in the processors to which the respective threads are allocated to an address space referred to by each thread such that the hardware resources can be referred to by each thread.

4. A non-transitory computer-readable recording medium having stored therein a program for debugging at least one thread among a plurality of threads which are executed in association with each other on a computer and adapted to sequentially execute respective predetermined command sequences of threads, wherein the program causes the computer to:

execute at least some processing of at least one target thread to be debugged among the plurality of threads;

execute non-target threads, which are threads other than the at least one target thread among the plurality of threads, during execution of the at least one target thread while restricting advance of processing of the command sequences of the non-target threads; and when debugging a target thread, embed a command in each non-target thread to execute processing to jump to itself, wherein the advance of processing of the command sequences of the non-target threads is restricted by causing the non-target threads to execute the embedded command, wherein the plurality of threads are respectively allocated to a plurality of processors within the computer and executed, and these threads map hardware resources in the processors to which the respective threads are allocated to an address space referred to by each thread such that the hardware resources can be referred to by each thread.

* * * * *